Jan. 26, 1971  E. D. DELANEY  3,557,490

POTS FOR HORTICULTURAL PLANTS

Filed Jan. 23, 1969

INVENTOR
ERIC DENYS DELANEY
BY McGlew + Toren
ATTORNEYS

United States Patent Office 3,557,490
Patented Jan. 26, 1971

3,557,490
POTS FOR HORTICULTURAL PLANTS
Eric Denys Delaney, The Mill House,
Sydenham, Oxfordshire, England
Filed Jan. 23, 1969, Ser. No. 793,512
Int. Cl. A01g *27/00*
U.S. Cl. 47—38.1                                  9 Claims

ABSTRACT OF THE DISCLOSURE

A horticultural plant pot comprising an inner compartment for the plant and soil, and a separate outer compartment for liquid, with an orifice in a wall common to the compartments to allow flows of liquid and air between the compartments, and with means for restricting the flow of liquid to the inner compartment, is provided with a capillary element within the inner compartment to intercept the direct flow of liquid from the orifice to the soil.

---

This invention relates to pots for horticultural plants, the object being to provide improvements therein.

Potted horticultural plants require to be supplied with moisture at controlled rates. It has always been a difficult matter to ensure this when the plant has to be left unattended for a long period of time, for example, when the owner goes on holiday.

According to this invention, a pot for a horticultural plant, comprising two separate compartments, one or the first compartment being adapted to contain the plant and the soil therefor, the other or second compartment being adapted to contain liquid, the two compartments being separated from each other by at least one common wall, at least one orifice being provided in a said common wall at or near to the bottom end of the first compartment to allow flows of liquid and of air between the two compartments, a tubular element being provided at the bottom end of the first compartment, one end of the said tubular element being open within the first compartment and located above the level of the said orifice or orifices, the other end of the said tubular element being open and located externally of the pot, a tube disposed within and extending down the second compartment, the top end of the tube being open to the exterior of the pot, the bottom end of the tube being open in the second compartment and spaced from the bottom end of the second compartment, an outer wall of the second compartment being provided with a hole for venting air from the said compartment, and a plug being provided for closing the said vent hole, the said vent hole being located below the level of the open top end of the said tube, and the second compartment being closed except for the said orifice or orifices, the said tube, and the said vent hole, is characterised in that a capillary element is disposed within the first compartment and above said orifice or orifices whereby to intercept direct flow of liquid from said orifice or orifices to the soil in the said first compartment.

The said capillary element will operate as a wick.

Figure 1:
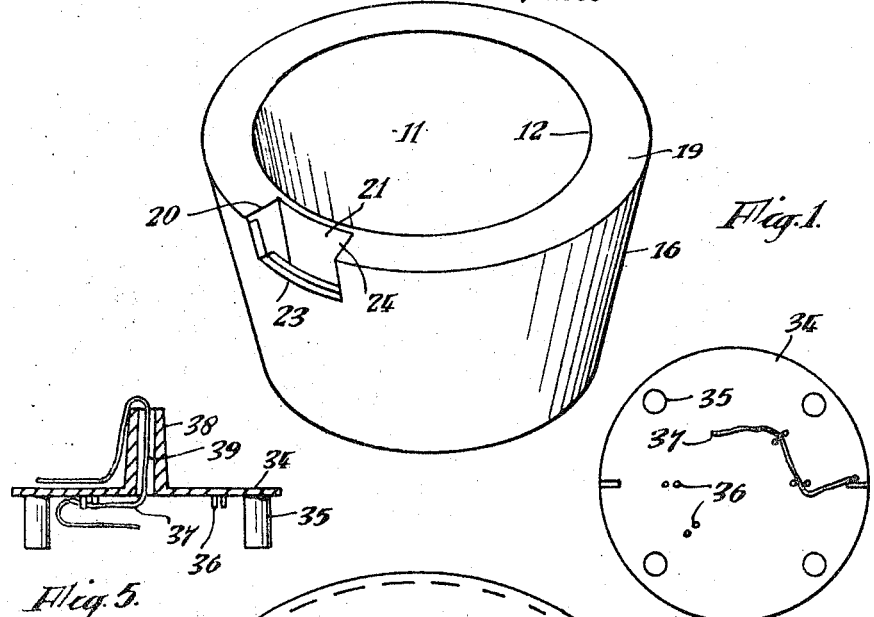
Figures 2, 4, 5:
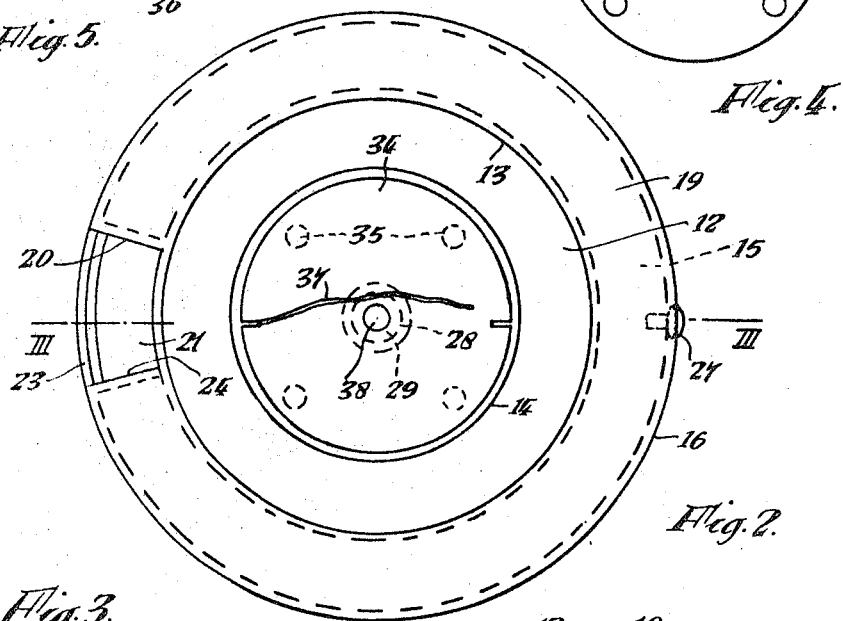
Figure 3:
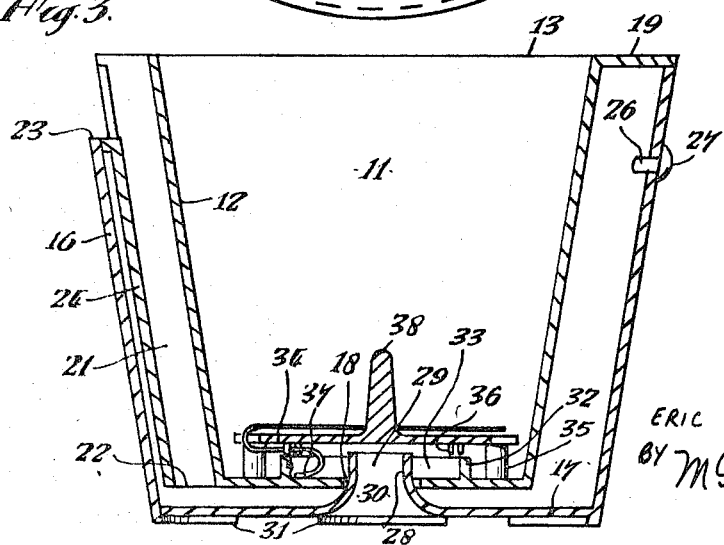

Embodiments of the invention are shown in the accom drawings, wherein:

FIG. 1 is a perspective view of the plant pot;
FIG. 2 is a plan view of the pot shown in FIG. 1;
FIG. 3 is a sectional elevation taken on line III—III of FIG. 2;
FIG. 4 is an inverted plan view of an element of the plant pot shown in FIGS. 2 and 3; and FIG. 5 is a sectional elevation of a modified form of the element shown in FIGS. 2, 3, and 4.

In FIGS. 1–4, a first compartment 11 is provided by an inner container 12 which is substantially of the same shape as a normal plant pot, that is, with an open top 13 and a closed bottom 14, and decreasing in horizontal cross-sectional area from top to bottom; the compartment 11 is circular in horizontal cross-section or plan, but it may be rectangular, polygonal or any other desirable shape.

A second compartment 15 is provided by an outer container 16, which second compartment is disposed immediately outside of the first compartment 11 and is annular and concentric with the first compartment; however, when the first compartment 11 is other than circular in plan the second compartment 15 may be correspondingly arranged around the first compartment.

The bottom end 17 of the container 16 is spaced from and below the bottom end 14 of the container 12 to provide a space which is part of the compartment 15.

The top end of the second compartment 15 is closed by a top wall 19 except for a portion 20 which provides part of the top open end of a filling tube 21. The tube 21 is disposed within the compartment 15 and extends between the top and bottom ends of the said compartment, the bottom end 22 of the tube being open and spaced from the bottom end wall 17 of the outer container 16, whilst the top end is open and formed by the said portion 20 of the top wall 19 and a portion 23 which is omitted from the adjacent top of the side wall of the outer container 16. The tube 21 is formed by an element 24 substantially of chanel section which has its side and top edges secured to the side and top walls of the container 12, and the top of its front wall secured to the wall of the container 16, in liquid-tight and air-tight manner; the element 24 may be moulded integrally with the container 12.

A hole 26 is provided in the side wall of the container 16, at a position below the level of the top open end 20, 23 of the tube 21, and the hole 26 is adapted to be closed by a plug 27.

A tubular extension 28 of the bottom wall 17 of the outer container 16 extends upwardly from said bottom wall 17 through a hole 18 in the bottom wall 14 of the inner container 12 to an elevation substantially above the bottom wall 14, the top end 29 of the tube 28 being open to the inner compartment 11, whilst the bottom end 30 of the said tube is open to the exterior of the outer container 16. The tube 28 passes loosely through the hole 18 in the bottom wall 14 so as to allow liquid and air to flow between the two compartments 11 and 15.

The outer container 16 is provided, externally of its bottom wall 17, with feet 31 which enable air to reach the open bottom end 30 of the tube 28.

An upstanding annular rib 32 extends from the upper surface of the bottom wall 14 of the inner container 12 and forms, with the upstanding portion of the tubular extensions 28, a well 33 into which liquid will flow from the chamber 15 through the hole 18.

A plate 34 is provided to cover the well 33, and the plate is provided on its under surface with feet 35, to sit upon the upper face of the bottom wall 14 of the inner compartment 11 so as to support the plate 34 at a suitable elevation which will provide a space between the top edge of the annular rib 32 and the underside of the plate 34, and also a space between the top open end 29 of the tubular extension 28 and the underside of the plate.

Located below the underside of the plate 34, and attached to the said underside of the plate by pins 36 which project from said underside, is one end portion of a textile element 37 the end of which element depends into the well 33. The textile element 37 passes around the edge of the plate 34, to the upper side of the plate so as to be embedded or otherwise located in soil which will be filled into the inner compartment 11 on top of the plate. A pin 38 formed on the upper face of the plate 34 will provide a handle to enable the plate to be placed into or removed from the inner container 11.

The textile element 37 will operate as a wick to ensure a capillary flow of liquid into the soil contained in the inner compartment 11. If desired, a supply of sand, soil, or other granular, particulate or fibrous material may be disposed around the plate and/or in the said well to assist said capillary flow.

In use, a plant together with the usual soil is disposed in the first or inner compartment 11 in the usual manner. The plug 27 is removed from the hole 26, which provides an air vent from the compartment 15, and water, or other liquid, is charged into the outer compartment 15 through the open top 20, 23 of the tube 21 which provides a filling tube for the liquid. The arrangement of the open top of the filling tube 21, which open top is provided by the omitted portion 20 of the top wall 19 and the omitted portion 23 of the side wall of the container 16, enables filling to be effected very conveniently. The liquid will flow into the compartment 15 through the open bottom end 22 of the filling tube 21 and will rise in the compartment. When the liquid in the compartment 15 reaches the level of the vent hole 26, or earlier if desired, the hole 26 is closed by the plug 27.

Liquid can only flow into the compartment 11, containing the soil and plant, through the orifice 18; the orifice is only large enough to allow a small flow of liquid therethrough (for convenience of illustration the orifice 18 is shown in the drawings larger, in relation to the remainder of the pot, than it would actually be), and therefore no considerable amount of liquid will flow therethrough whilst the compartment 15 is being filled and before the hole 26 is closed by the plug 27.

When the vent hole 26 is sealed by the plug 27, and whilst there is liquid in the compartment 15 to a level above the bottom end 22 of the filling tube 21, air can enter the second or outer compartment 15, to replace any liquid which flows out of that compartment, only through the orifice 18, and then only when the said orifice is not sealed by liquid in the bottom of the first or inner compartment 11.

A small quantity of liquid will flow from the compartment 15 into the bottom of the compartment 11, to provide moisture for the plant, through the orifice 18 when the level of liquid in the compartment 11 is not sufficient to cover or seal the said orifice. At the same time air will penetrate the soil in the compartment 11 and enter the compartment 15 through the orifice 18 in order to replace the liquid which has flowed between the two compartments. As soon as the level of the liquid in the compartment 11 is such as to cover or seal the orifice 18, flow of air and of further liquid between the two compartments will cease. When the liquid in the compartment 11 has been used up by the plant, sufficiently to unseal the orifice 18, flow of air and liquid between the two compartments will recommence and this cycle of events will be repeated until the whole of the liquid in the compartment 15 above the seal provided by the bottom end of the filling tube 21 has flowed into the compartment 11. According to the volume of the compartment 15, it may take a long period of time for the compartment 15 to be emptied of liquid, and this period may be greater, for example, than the period of time that the owner of the plant is away on holiday or otherwise.

The plate element shown at 34–38 in FIGS. 2, 3, and 4 may be modified in the manner shown in FIG. 5 wherein the pin 38 providing a handle on the upper face of the plate 34 is tubular. Thereby, the textile element or wick 37 can be passed through the passage 39 in the tubular pin 38 from the underside of the plate to the top side thereof.

The tube 28 provides means for air to enter the soil at the bottom end of the compartment 11, and thus assist in aerating or ventilating the soil, and it also will provide an overflow duct for any abnormal amount of liquid which may flow into the compartment 11 or be absorbed by the soil by reason, for example, of the plug 27 being insecure or displaced, and thus preventing flooding of the plant.

The second compartment may be formed in any suitable manner outside of the first compartment. For example, the second compartment may be substantially of crescent-shape in plan, and extend the full length or height of the first compartment, being in the form of a proturberance on the outside of the first compartment.

The plant pot may be made of clay, metal, plastics or any other suitable material. The plate 34 may be made of ceramic or plastics material.

What I claim and desire to secure by Letters Patent is:

1. A pot for a horticultural plant, comprising two separate compartments, one or the first compartment being adapted to contain the plant and the soil therefor, the other or second compartment being adapted to contain liquid, the two compartments being separated from each other by at least one common wall, at least one orifice being provided in a said comon wall at or near to the bottom end of the first compartment to allow flows of liquid and of air between the two compartments, a tubular element being provided at the bottom end of the first compartment, one end of the said tubular element being open within the first compartment and located above the level of the said orifice or orifices, the other end of the said tubular element being open and located externally of the pot, a tube disposed within and extending down the second compartment, the top end of the tube being open to the exterior of the pot, the bottom end of the tube being open in the second compartment and spaced from the bottom end of the second compartment, an outer wall of the second compartment being provided with a hole for venting air from the said compartment, and a plug being provided for closing the said vent hole, the said vent hole being located below the level of the open top end of the said tube, and the second compartment being closed except for the said orifice or orifices, the said tube and the said vent hole, characterized in that a capillary element is disposed within the first compartment and above said orifice or orifices whereby to intercept direct flow of liquid from said orifice or orifices to the soil in the said first compartment.

2. A pot according to claim 1, wherein the said capillary element comprises a plate provided on its underside with feet adapted to rest upon the bottom wall of the first compartment thereby to elevate the plate above the said orifice or orifices.

3. A pot according to claim 2, having a textile element, adapted to provide a wick, attached to the plate and extending from below the plate to above the plate.

4. A pot according to claim 3, wherein the textile element extends around an edge of the plate.

5. A pot according to claim 3, where the textile element extends through an orifice in the plate.

6. A pot according to claim 2, wherein the plate is provided on its upper face with an upstanding pin adapted to provide a handle for manipulation of the plate.

7. A pot according to claim 6, wherein the said pin is tubular, and a textile element, adapted to provide a wick, is attached to the plate and extends from below the plate through the said tubular pin to above the plate.

8. A pot according to claim 2 wherein the plate is made of plastics.

9. A pot according to claim 2 wherein the plate is made of ceramic material.

References Cited

UNITED STATES PATENTS

| | | | |
|---|---|---|---|
| 126,112 | 4/1872 | Von Levetzow | 47—34 |
| 1,376,117 | 4/1921 | Sandor | 47—34 |
| 2,691,245 | 10/1954 | Yohe | 47—38.1 |
| 3,192,665 | 7/1965 | Cloud | 47—38.1 |

FOREIGN PATENTS

| | | | |
|---|---|---|---|
| 656,820 | 1/1965 | Belgium | 47—38.1 |
| 22,840 | 1893 | Britain | 47—34 |
| 95,840 | 5/1939 | Sweden | 47—38.1 |

ROBERT E. BAGWILL, Primary Examiner